United States Patent [19]

Zimmer et al.

[11] Patent Number: 5,220,975
[45] Date of Patent: Jun. 22, 1993

[54] DRIVE-SLIP CONTROL SYSTEM

[75] Inventors: Richard Zimmer, Fellbach; Armin Müller, Backnang, both of Fed. Rep. of Germany

[73] Assignee: Mercedes-Benz AG, Fed. Rep. of Germany

[21] Appl. No.: 789,190

[22] Filed: Nov. 8, 1991

[30] Foreign Application Priority Data

Nov. 9, 1990 [DE] Fed. Rep. of Germany ....... 4035653

[51] Int. Cl.$^5$ .............................................. B60K 28/16
[52] U.S. Cl. ...................................... 180/197; 475/85
[58] Field of Search .................. 180/197, 76, 249; 475/86, 85; 364/424.1; 303/102, 103

[56] References Cited

U.S. PATENT DOCUMENTS

| | | | |
|---|---|---|---|
| 4,589,511 | 5/1986 | Leiber | 180/197 |
| 4,741,407 | 5/1988 | Torii et al. | 180/76 |
| 4,790,404 | 12/1988 | Naito | 475/86 |
| 4,953,654 | 9/1990 | Imaseki et al. | 180/197 |
| 4,966,250 | 10/1990 | Imaseki | 180/197 |
| 4,976,667 | 12/1990 | Goscenski, Jr. | 475/86 |
| 5,048,899 | 9/1991 | Schmitt et al. | 180/197 |
| 5,072,995 | 12/1991 | Kawamura et al. | 180/197 |
| 5,092,436 | 3/1992 | Sterler | 180/197 |
| 5,133,696 | 7/1992 | Kobayashi | 475/86 |

FOREIGN PATENT DOCUMENTS

| | | | |
|---|---|---|---|
| 3025282 | 2/1982 | Fed. Rep. of Germany | 180/76 |
| 3025562 | 2/1982 | Fed. Rep. of Germany . | |
| 3427725 | 8/1985 | Fed. Rep. of Germany . | |
| 3528389 | 2/1987 | Fed. Rep. of Germany . | |
| 3708063 | 9/1987 | Fed. Rep. of Germany . | |
| 3615638 | 11/1987 | Fed. Rep. of Germany . | |
| 3721628 | 1/1988 | Fed. Rep. of Germany . | |
| 3714332 | 2/1988 | Fed. Rep. of Germany . | |
| 3810449 | 10/1988 | Fed. Rep. of Germany . | |
| 3813305 | 11/1988 | Fed. Rep. of Germany | 475/86 |
| 3842760 | 7/1989 | Fed. Rep. of Germany . | |
| 3828656 | 3/1990 | Fed. Rep. of Germany . | |
| 67630 | 4/1986 | Japan | 475/86 |
| 226446 | 9/1989 | Japan | 180/197 |

Primary Examiner—Margaret A. Focarino
Assistant Examiner—Kevin Hurley
Attorney, Agent, or Firm—Evenson, McKeown, Edwards & Lenahan

[57] ABSTRACT

In a drive-slip control system (ASR) for a motor vehicle with rear-axle drive, operating on the principle of retarding again a driven vehicle wheel having a tendency to spin by activating its wheel brake, the rear-axle differential is provided with a locking device which, as the difference in the propulsive torques which can be transmitted via the driven vehicle wheels, between the latter and the roadway increases, develops an increasing degree of locking. The locking device is constructed using multi-plate clutches, which provide a frictional, limited-slip coupling between the driving ring gears and the cage of the differential on which the differential bevel gears of the differential are also mounted. In addition, the multi-plate clutches can be applied hydraulically, controlled being exercised via a solenoid valve.

15 Claims, 3 Drawing Sheets

DRIVE-SLIP CONTROL SYSTEM

BACKGROUND AND SUMMARY OF THE INVENTION

The present invention relates to a drive-slip control system (ASR) for a motor vehicle in which a differential is provided for transmitting the engine output torque or gearbox output torque to two driven vehicle wheels. The ASR operates on the principle of retarding again a vehicle wheel having a tendency to spin and driven via the differential by actuating its wheel brake and, if a deceleration of both driven vehicle wheels becomes necessary, of reducing the engine output torque, e.g. by intervention in at least one of the ignition, the fuel supply, and throttle-valve position alteration.

A drive-slip control system is shown in German Offenlegungsschrift Nos. 1,806,671; German Offenlegungsschrift 3,127,302; DE 36 15 638 A1; and DE 38 10 449 A1. It is further more also known, as can be seen in DE 33 19 152 C2, to provide additional brakes, configured, for example, as multiplate brakes, for the driven vehicle wheels. The brakes form a structural unit with the differential but act on the driving side shafts. These known control system operating, at least in the initial phase of a situation requiring drive-slip control, with braking intervention have the disadvantage that, in cases in which the one driven vehicle wheel is rolling on an area of roadway which has a high coefficient of adhesion ($\mu$) between the roadway and this wheel but the other driven vehicle wheel is rolling on an area of roadway which has a very low coefficient of adhesion, a considerable proportion of the driving torque provided by the engine via the gearbox has, as it were, to be dissipated to ensure that propulsive torque can be transmitted via the vehicle wheel which is more capable of transmission. The result of this is that, in the case of vehicles with a relatively low-powered engine, i.e. vehicles with an engine power of less than 70 kW, the weight of which is about 10000 N to 12000 N, their climbing ability in the above mentioned "$\mu$ split" conditions is no longer sufficient to allow negotiation of relatively steep gradients of, for example 20%. Hitherto, it has therefore only been possible to implement drive-slip control systems of the type mentioned at the outset on vehicles in the higher performance categories.

The use of lockable differentials with a controllable degree of locking for drive-slip control is shown in DE 35 28 389 A1; DE 37 08 063 A1; and DE 38 28 656 A1. It is possible with these differentials to compensate speed and hence also slip difference between the driven vehicle wheels, although it must then be possible, for the purpose of slip limitation, to adjust in a controlled manner the driving torque coupled into the drive train in terms of the absolute amount.

In order in this way to be able to implement an ASR which guarantees a sufficient dynamic stability of the vehicle, very high degrees of locking of the differential must be inputted, and this leads to considerable structural complexity as regards the locking elements which, in typical design, are in the form of friction clutches. Furthermore, a rapid torque reduction in the drive train must be possible but a torque reduction by altering the position of the throttle valve or the fuel feed, for example, would be too slow for a large number of situations because of the inertia of the engine and the drive train as a whole. Additional actuating devices are therefore required, e.g. a disc brake acting on the input shaft of the differential, or an actuator by which the engine clutch can be disengaged.

It is therefore an object of the invention to provide a drive-slip control system which is of simple overall construction and imparts good traction behavior, in particular good climbing ability, even in the case of lower performance vehicles.

This object is achieved according to the present invention by providing the differential with at least one locking device which develops, as the difference in the propulsive torques which can be transmitted via the driven vehicle wheels between the latter and the roadway increases, an increasing degree of locking which is, however, limited to a value of around 40% relative to the maximum amount.

By virtue of the constructional features of the present invention, namely, that the differential is provided with a locking device which, as the difference in the propulsive torques which can be transmitted via the driven vehicle wheels, between the latter and the roadway increases, develops an increasing degree of locking, but is limited as regards the maximum amount, it is ensured that only a markedly reduced part of the engine output torque is braked away by a braking intervention which may still be required because, due to the at least partial locking of the differential, a considerably higher proportion of the driving torque provided by the engine via the gearbox remains available, depending on the degree of locking which can be developed by the differential.

From the energy point of view, this is essentially due to the fact that no matter how the locking device is implemented, the amount of driving power which must be braked away to build up the degree of locking within the differential only corresponds to a torque difference, in contrast to a conventional drive-slip control system, in which, due to the braking intervention at the vehicle wheel with the tendency to spin, up to half of the driving torque provided by the engine has to be dissipated.

In order to achieve the required locking effect in the differential, at least one friction clutch is provided to bring about a frictional coupling of one of the driving ring gears or of one of the differential bevel gears of the differential to the cage on which these gears are rotatably mounted.

According to another feature of the drive-slip control system of the present invention, friction clutches are assigned individually to each of the side shafts of the driving axle. The friction clutches result in, as it were, an automatically operating locking device for which no control structure at all is required.

Alternatively or in combination with the foregoing features, electrohydraulic control elements are provided and are actuatable via solenoid valves which are controlled by output signals of an electronic control unit to produce control signals by processing output signals of wheel-speed sensors. The wheel speed sensor output signals, in their level or frequency, contain the information on the dynamic behavior at least of the driven vehicle wheels.

Likewise, as an alternative to or in combination with the above-described configurations of the drive-slip control system shear elements for the locking elements can be provided for the locking elements and filled with dilatant fluid, which likewise respond automatically and do not require any control apparatus.

Finally, another feature of the present invention is a configuration of the drive-slip control system which can be implemented at particularly low cost, for vehicles which are equipped with an anti-lock brake system which operates on the rear axle, i.e. the axle of the driven vehicle wheels, with common brake-pressure control.

BRIEF DESCRIPTION OF THE DRAWINGS

These and further objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
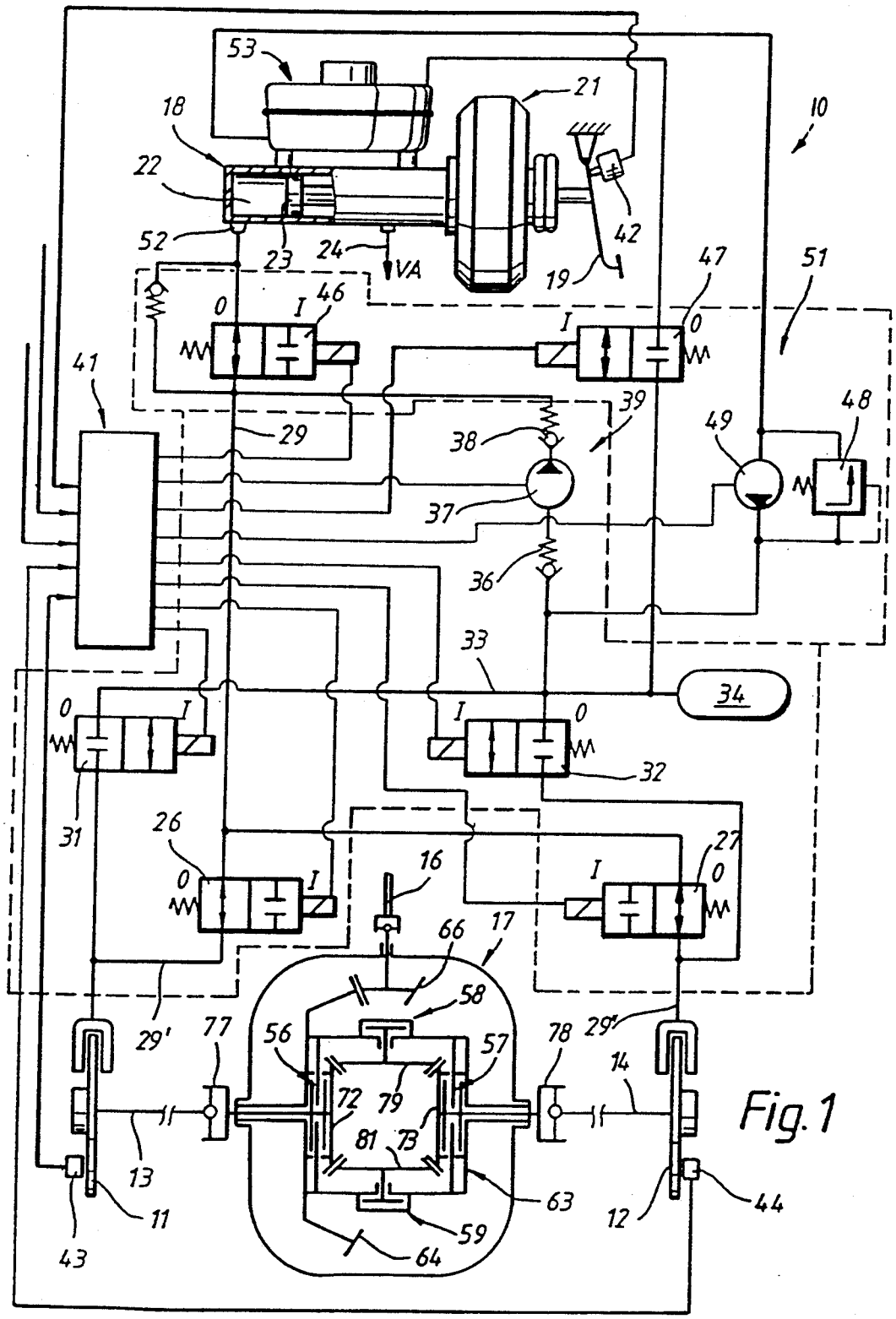
FIG. 1 is a schematic hydraulic diagram of the brake system of a road vehicle with rear-axle drive equipped with a drive-slip control system according to the present invention and with locking devices on the differential of the rear axle.

In FIG. 1, for a road vehicle with rear-axle drive equipped both with an anti-lock brake system (ABS) and with a drive-slip control system (ASR), which represents the part assigned to the driven vehicle wheels, of the service brake system 10, which is driven vehicle wheels, of the service brake system 10, which is a hydraulic dual-circuit brake system, the front wheel brakes (not shown) are combined to form a brake circuit and the rear wheel brakes 11 and 12, which are also represent the driven vehicle wheels, are combined to form a rear-axle brake circuit. Driving side shafts 13 and 14, via which rear wheels of the vehicle are driven, are drive-coupled to the gearbox or engine output shaft 16, which is indicated only schematically via a differential designated generally by numeral 17 which distributes the engine torque provided via the output shaft 16 to the rear wheels 11 and 12.

The two brake circuits are static brake circuits to which brake pressure is supplied by a braking unit designated generally by numeral 18 and configured as a known tandem master cylinder which is actuable by a brake pedal 19 via a brake booster 21. The rear-axle brake circuit is connected to the secondary output-pressure space 22 of the braking unit 18. The space 22 is delimited in a pressure-tight but mobile manner by a floating piston 23 from the primary output-pressure space of the braking unit, to which the master brake line 24 of the front-axle brake circuit is connected.

The ABS is implemented on the known return feed principle, according to which brake fluid discharged from one or more of the wheel brakes subjected to control is pumped back into that output pressure space of the braking unit 18 is associated with the respective brake circuit or in brake-pressure reduction phases of the anti-lock brake system. brake or brakes 11 and/or 12 again and, if both wheel brakes 11 and 12 have a tendency to spin and accordingly have to be braked, of reducing the engine torque, e.g. by intervention into the fuel feed, the ignition or the air supply to the engine.

Inlet valves 26 and 27 individually assigned to each of the wheel brakes 11 and 12 are provided as brake-pressure control valves, used both for anti-lock brake control and for drive-slip control. Via the inlet valves 26, 27 the brake-line branches 29' and 29", which start on a branch point 28 of the master brake line 29 of the rear-axle brake circuit are passed. The master brake line 29 is connected to the secondary output pressure space 22 of the braking unit 18, and via the inlet valves 26, 27, the coupling of brake pressure into the wheel brakes 11, 12 is effected. Outlet valves 31 and 32 individually assigned to the wheel brakes 11 and 12 are also provided as brake-pressure control valves, via which outlet valves the wheel brakes 11 and/or 12 can be connected individually or in common to a return line 33 of the rear-axle brake circuit. A low-pressure buffer accumulator 34 is connected to the return line 33 and, via an inlet nonreturn valve 36, an electrically driven return feed pump 37 is also connected to the return line. The pump 37 is also connected, via an outlet nonreturn valve 38, to the master brake line 29 of the rear-axle brake circuit.

The inlet valves 26 and 27 are 2/2-way solenoid valves, the starting position 0 of which is their through-flow position, connecting the respective wheel brake 11 or 12 to the master brake line 29 of the rear-axle brake circuit, and the excited brake line 29 of the rear-axle brake circuit II, and the excited position I of which is a blocking position which decouples the respective wheel brake 11 or 12 from the master brake line 29.

The outlet valves 31, 32, are 2/2-way solenoid valves, the starting position 0 of which is their blocking position, in which the wheel brake or brakes 11 and/or 12 is or are shut off from the return line 33 and the excited position I of which is in each case a throughflow position, in which the wheel brake or brakes 11 and/or 12 is or are communicatingly connected to the return line 33.

Inlet and outlet valves corresponding to the above-described respective inlet and outlet valves 26, 31 and 27, 32 are individually assigned to the wheel brakes of the front-axle brake circuit, as is a return feed pump and a buffer accumulator connected to a return line of the brake circuit, which correspond structurally and functionally to the return line 33, the return feed pump 37 and the buffer accumulator 34 of the already-described rear-axle brake circuit.

With the hydraulic unit explained so far, comprising the inlet valves 26 and 27, the outlet valves 31 and 32, the buffer accumulator 34 and the return feed pump 37 with its inlet and outlet nonreturn valves 36 and 38 and designated generally by numeral 39, anti-lock control is possible at the rear axle in the sense of a single wheel to the effect that brake-pressure reduction, brake-pressure holding and renewed brake-pressure build-up phases are controllable independently of one another at the rear wheel brakes 11 and 12. That is, even brake pressure changes in phase opposition are possible, such that, while brake pressure is being reduced at one wheel brake, e.g. the left-hand rear wheel brake 11, brake pressure is being built up again at the right-hand rear wheel brake 12. The illustrated starting position 0 of the inlet valves 26 and 27 and of the outlet valves 31 and 32 is here associated both with normal braking, i.e. braking not subjected to anti-lock control, and with renewed brake-pressure build-up phases which take place within control cycles of the anti-lock control. The control signals required in the context of an anti-lock control cycle for driving the inlet valves 26, 27 and the outlet valves 31, 32 in a manner appropriate for control are produced by an electronic control unit designated generally by numeral 41, to which are fed as input signals at least the output signal of the brake-light switch 42, the output signals of known wheel-speed sensors 43 and 44, which, in the illustrative embodiment according to FIG. 1, are individually assigned to the rear wheels, and output signals produced by corresponding wheel-speed sensors (not shown) which are individually assigned to the front wheels of the vehicle. The signal level and/or frequency of these output signals contain the information on the dynamic behavior of the vehicle wheels. This electronic control unit 41 uses known algorithms to produce from these input signals the control signals required for driving the inlet valves 26 and 27, the outlet valves 31 and 32 and the return feed pump 37 in a manner appropriate for control.

To implement the drive-slip control system the following components are provided in FIG. 1, in addition to the components which are explained for the implementation of the anti-lock brake system, and form the ABS hydraulic unit 39: an ASR function control valve 46, an ASR outlet valve 47 and an electrically controllable precharging pump 49 provided with a pressure-relief valve 48, which form overall an additional hydraulic unit designated generally by numeral 51 which, in combination with the ABS hydraulic unit 39, permit the implementation of the drive-slip control function.

The ASR function control valve 46 is connected between the pressure outlet 52 of the braking unit 18, which pressure outlet 52 is assigned to the rear-axle brake circuit, and the master brake line 29 of the rear axle brake circuit. The valve 46 is a 2/2-way solenoid valve, the starting position 0 of which is its throughflow position, in which brake pressure can be coupled form the braking unit 18 into the master brake line 29 and, via the inlet valves 26, 27 and the brake lines 29', 29'', into the wheel brakes 11 and 12. Its excited position I, which is assigned to the ASR control mode, is its blocking position, when the braking unit 18 is shut off from the rear-axle brake circuit II and at least one or the other rear-wheel brake, 11 and/or 12, is subjected to brake pressure by the output pressure of the return feed pump 37 of the rear-axle brake circuit. The return feed pump 37 is utilized as an auxiliary pressure source in the ASR control mode and to which then brake fluid is fed from the reservoir 53 of the braking unit 18 by the precharging pump 49.

The ASR outlet valve 47 is also a 2/2-way solenoid valve which can be driven, by an ASR control signal produced by an electronic control unit 41, out of its blocking starting position 0 into an open excited position I. The ASR outlet valve is connected between the brake-fluid reservoir 53 of the braking unit and the return line 33 or the buffer accumulator 34 connected to the brake line 33. The ASR outlet valve 47 is only switched into its excited throughflow position I in the drive-slip control mode—expediently for the entire duration of an ASR control cycle, and otherwise remains held in its starting position 0.

In the ASR control mode, the inlet valves 26, 27 and the outlet valves 31, 32 of the ABS hydraulic unit 39 are used in a manner similar to that in the anti-lock control mode for controlling brake-pressure reduction phases. The control signals required for driving the inlet and outlet valves 26, 27 and 31, 32, respectively, of the ASR function control valve 46, the ASR outlet valve 47 and the return feed pump 37 and the precharging pump 49 in ASR control mode are again produced by the electronic control unit 41 by processing in accordance with known algorithms the wheel-speed sensor output signals. The control unit is constructed both for control of the ABS control mode and for the control of the ASR control mode.

As further functional elements of the drive-slip control system, the differential 17 is equipped with locking devices 56, 57 and/or 58, 59 which, as the difference in the propulsive torques which can be transmitted via the driven vehicle wheels, between the latter and the roadway increases, provide an increasing locking of the differential 17. The degree of locking $M_{SMG}$ is given by the relationship $$M_{SMG} = \frac{[M_{swr} - M_{swl}]}{M_{swr} + M_{swl}} \cdot 100 \, [\%]$$

where $M_{swr}$ and $M_{swl}$ denote the propulsive torques which can be transmitted via the right-hand side shaft 14 and the left-hand side shaft 13, respectively of the rear-axle drive and the vehicle wheels connected firmly to the latter in terms of rotation.

Figure 2:
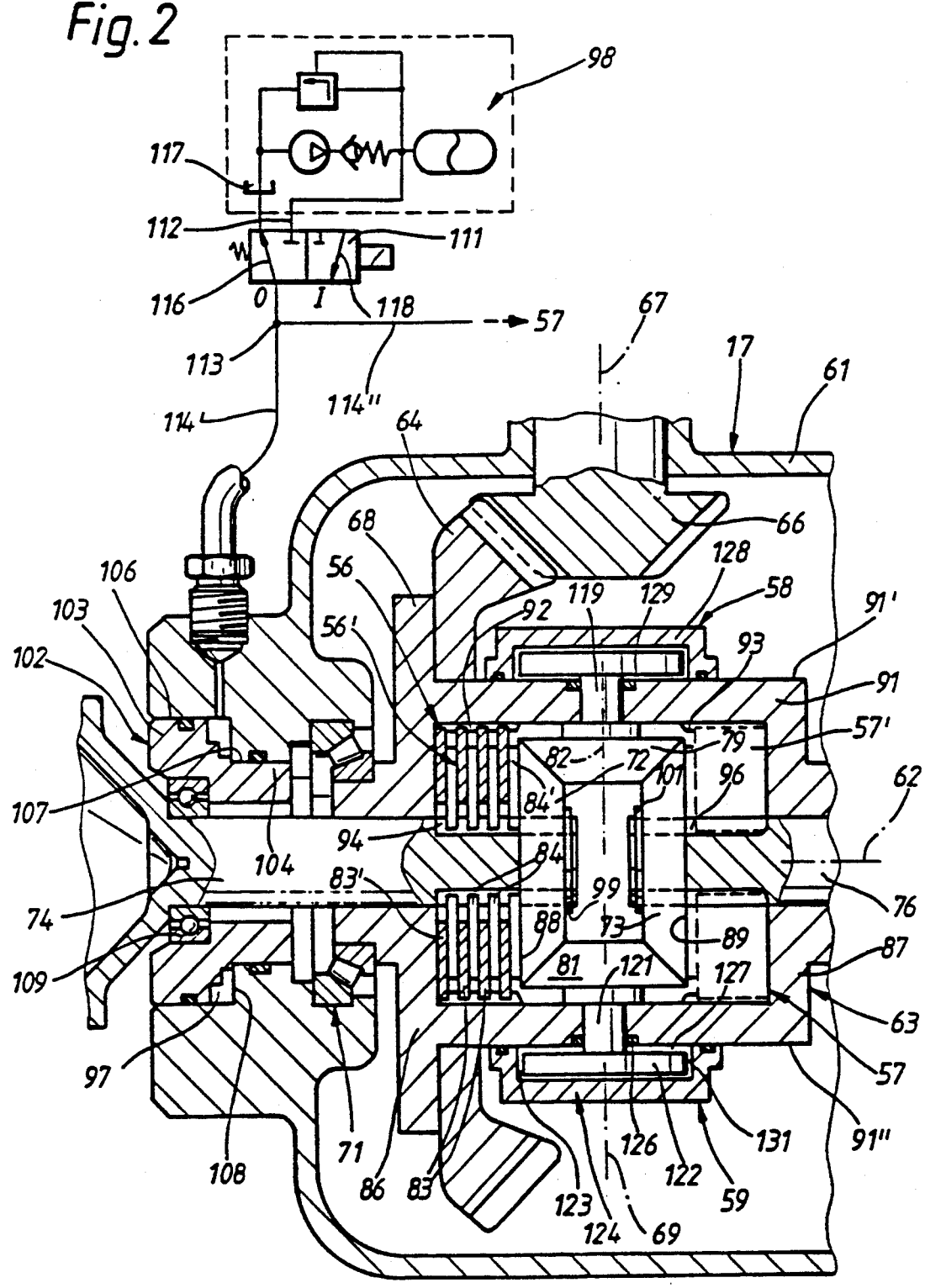
FIG. 2 is a cross-sectional enlarged view of the differential shown in FIG. 1, along a plane containing the axes of rotation of the bevel drive pinion, of the ring gear and of the differential bevel gears of the differential.

The locking devices 56 and 59 are structurally integrated into the differential 17, which is otherwise implemented in a configuration which is explained with regard to FIG. 2. A cage designated generally by numeral 63 is mounted in a housing 61 of the differential 17 in the arrangement so as to be rotatable about a horizontal axis 62 extending at right angles to the longitudinal axis of the vehicle. A large ring gear 64 is rotatably-firmly connected to the cage 63 and is in mesh with a bevel drive pinion 66 which, for its part, is mounted on the housing 61 so as to be rotatable about a horizontal axis 67 extending parallel to the axis of the vehicle and is rotatably fixedly coupled to the propeller shaft 16 of the vehicle drive train. The rear-axle transmission ratio $i_{HA}$ of the drive train is determined by the diameter ratio of the bevel drive pinion 66 and of the large ring gear 64.

Driving ring gears 72, 73, which are rotatable about the axis 62 of rotation of the cage 63 and, by way of shafts 74, 76 emerging laterally from the housing 61, are also rotatably mounted on the housing 61 in the cage 63. Apart from a flange 68 provided for the purpose of securing the large ring gear 64, the cage 63 is symmetrical about its longitudinal center plane 69. This symmetry also exists as regards the rotatable mounting 71 of the flange 68 on the housing 61 of the differential 17. The ring-gear shafts 74 and 76 are coupled rotatably firmly or fixed to the side shafts 13, 14 of the rear-axle drive via universal joints 77, 78, respectively (FIG. 1) or by joints which are functionally equivalent thereto.

The driving ring gears 72, 73 are in mesh with respective bevel gears 79, 81 mounted on the cage 63 so as to be freely rotatable about an axis 82 extending at right angles to the horizontal axis 62 of rotation of the driving ring gears 72, 73.

The locking device 56, 57, of which only locking device 56 is assigned to the left-hand rear wheel with those details of its construction which are essential to its function illustrated in FIG. 2, are configured as multi-plate clutches which can be actuated by slight axial shifts of the driving ring gears 72, 73 in order to develop a high friction between the driving ring gears 72 and 73 and the cage 63 of this differential 17. As a result of the high friction, the differential 17 is subjected to locking with a relatively high but limited degree of locking. Such shifts of the driving ring gears 72, 73 result and the locking occurs between the drawing ring gears 72, 73 and the differential bevel gears 79, 81, from axial components of the forces arising in the intermeshing teeth when different torques act on the driving ring gears 72, 73. The different torques occur whenever the driven vehicle wheels are rotating at different angular velocities $\omega_{Rr}$ and $\omega_{Rl}$.

The multi-plate clutches provided as locking devices 56 and 57 comprise stator plates 83 coupled rotationally firmly to the cage 63 but mounted on the cage 63 so as to be displaceable in the direction of the horizontal axis 62 of rotation of the driving ring gears 72, 73, and rotor plates 84 coupled rotationally firmly or fixedly to the ring-gear shafts 74, 76 are likewise displaceable axially in the direction of the axis 62 of rotation of the shafts. The stator and rotor plates 83, 84, respectively, each form within the locking devices 56, 57 a plate assembly 56' and 57' respectively, within which a rotor plate 84 is arranged between two stator plates 83. The outermost stator plates 83' of the two plate assemblies 56' and 57' can be connected firmly to the lateral end wall 86, 87, respectively, of the cage 63, and the case innermost rotor plates 84' can be mounted firmly on the annular outer base surfaces 88 and 89 of the two driving ring gears 73 and 74, respectively.

To achieve rotatably firm (or fixed) coupling of the stator plates 83 to the cage 63 which nevertheless permits axial displaceability of the stator plates 83 configured as annular discs, the cage casing 91, which is of circular-cylindrical interior configuration, is provided with internal straight teeth 92, 93 which mesh with complementary external teeth of the stator plates 83 of both plate assemblies 56' and 57'.

In a similar manner, the rotatably firm (or fixed) coupling of the rotor plates 84, which nevertheless permits axial displaceability of the rotor plates 84, is achieved by external straight teeth 94, 96 of the ring-gear shafts 74, 76, respectively, and meshing therein with, complementary internal teeth of the rotor plates 84. The axial displaceability of the driving ring gears 72, 73 is also achieved by providing them with internal teeth complementary to the external teeth 94, 96 of the ring-gear shafts 74, 76, respectively.

With the configuration of the locking devices 56 and 57 as explained so far, maximum degrees of locking around 35% to 40% in the differential 17 can be achieved using the gearing forces arising between the differential bevel gears 79 and 81 and the driving ring gears 72 and 73.

In order to be able to achieve even higher degrees of locking in the differential 17, if necessary, the ring-gear shafts 74, 76 are axially displaceable, each by valve-controlled subjection of a driving-pressure space 97 to an output pressure of an auxiliary pressure source denoted generally by numeral 98, and thus force controlled, by a small stroke amounting to about 1 mm sufficient for an adequate compressibility of the plate assemblies 56' and 57'. The shafts 74, 76 are provided at their inner ends with driving stops 99, 101, respectively by way of which the outward displacement of the ring-gear shafts 74, 76 can be transmitted with positive engagement to the driving ring gears 72 and 73.

This driving-pressure space 97 is delimited, in an axially movable manner, by an annular piston denoted generally by numeral 102, which coaxially surrounds the ring-gear shaft 74 and is configured as a step piston with an outer piston stage 103 of larger diameter and an inner piston stage 104 of small diameter. Each stage is guided such that it can be displaced in pressure-tight fashion in respective bore stages 106 and 107 of the housing 61 which each have a corresponding diameter and merge into one another via a radial annular shoulder 108. The ring-gear shaft 74 is rotatably mounted on the annular piston 103 by a thrust ball bearing 109 and, via this bearing 109, is connected displacedly firmly (or fixedly) to the annular piston 103. The joints 77, 78 coupling ring-gear shafts 74, 76, to the side shafts 13 and 14 (FIG. 1) are configured so that the axial offset of the ring-gear shafts 74, 76 which occurs when the locking devices 56, 57 respond, is taken up within these joints.

A hydraulic pressure source, present on the vehicle in any case, e.g. in the context of a power-assisted steering system or a level control system, is used as auxiliary pressure source 98, to the output pressure of which the driving-pressure spaces 97 can be subjected for the actuation of the locking devices 56, 57. The pressure source 98 operates at an output pressure level of between 60 and 120 bar, with which sufficiently large forces for the actuation of the locking devices 56, 57 can be achieved, in view of the large annular face corresponding to the difference of the clear cross-sectional areas of the bore stages 106 and 107 on which the annular piston 102 is subjected to the output pressure of the auxiliary pressure source 98. For also driving the locking devices 56, 57, hydraulically actuable in this way, a 3/2-way solenoid valve 111 is connected between the pressure outlet 112 of the auxiliary pressure source 98 and a branch point 113 of the control line, from which the control-line branches 114' and 114" leading to the driving-pressure spaces 97 of the locking devices 56 and 57 start.

In the starting position 0 of the lock-control solenoid valve 111, the pressure outlet 112 of the auxiliary pressure source 98 is shut off from the control-line branches 114' and 114", and the driving-pressure spaces 97 are relieved towards the unpressurized reservoir 117 of the auxiliary pressure source 98 via a flow path 116 of the lock-control valve 111. In the excited position I of the lock-control valve 111, into which the valve III is switched over by an output signal of the electronic control unit 41 when the latter recognizes from the output signals of the wheel-speed sensors of the vehicle (in particular the wheel-speed sensors 43, 44) that at least one of the driven vehicle wheels has a tendency to spin, the pressure outlet 112 of the auxiliary pressure source 98 is connected via a further flow path 118 of the lock-control valve 111 to the control-line 10 branches 114' and 114", and the reservoir 117 of the auxiliary pressure source 98 is shut off from the control-line branches 114' and 114".

The additional locking devices 58, 59 are, however, by themselves also suitable for achieving a locking effect in the differential 17, and are configured as fluid-shear elements, whose the working medium dilatant fluid, i.e. a fluid which, when exposed to a shear $\gamma$ in which both a minimum $\gamma_{min}$ of the shear and a threshold value $\dot{\gamma}_s$ of the shear rate are thereby exceeded, undergoes a drastic increase in viscosity associated with a jump in the stiffness of the shear element.

The fluid-sheer elements 58, 59 are arranged on externally flat regions 91', 92" of the cage casing 91. The differential bevel gears 79 and 81 of the differential 17 are mounted on these flat regions in freely rotatable fashion with their shaft journals 119, 121, respectively. In order to avoid an imbalance of the cage 63 which rotates at the average speed of the two driven vehicle wheels, the two fluid-sheer elements are of identical construction.

Each of the two shear elements 58, 59 comprises a circular, table shear disc 122 which is attached in a rotatably fixed manner to a free end portion of the respective shaft journal 119, 122 of the differential bevel gear 79 and 81, respectively. The free end portion projects a short way beyond the flat external face region 91', 91", respectively, of the cage 63. These shear discs 122 are each arranged in a flat-cylindrical shear space 123 which is completely filled with the dilatant operating fluid and is delimited at the outside by a cover 124 having the shape of a flat pot. The cover 124 is attached in fluid-tight fashion to the respective flat external casing face region 91', 91", respectively, of the cage 63 and is sealed off by at least one ring seal 126 from the shaft journal 119, 121, respectively.

The arrangement of the shear discs 122 is such that an annular gap 127 remains between these and the flat external face regions 91', 91" of the cage casing. Circular-disc-shaped gaps 129, each of the same width, remain between the outer circular faces and the inner, flat circular face of the base part 128 of the pot-shaped cover 124. The radial width of the circular-cylindrical gap 131 between the lateral surface of the respective shear disc 122 and the radially opposed inner lateral surface, of the pot-shaped cover 124 corresponds to this gap width. These gap widths are dimensioned such that, during the rotation of the shear discs 122 which result from rotations of the differential bevel gears 79 and 81, the minimum value $\gamma_{min}$ of the shear and, above certain minimum speed of the differential bevel gears 70 and 81, also the threshold value $\dot{\gamma}_s$ of the shear rate in the dilatant fluid are exceeded, above which the viscosity jump of the dilatant fluid occurs, and an increasingly firmer, material connection between the respective shear disc 122 and those parts of the cage 63 and of the respective cover 124 which surround the disc thereby occurs, leading to the desired locking effect in the differential 17.

A dilatant fluid suitable for use in the shear elements 58 and 59 is, for example, a copolymer dispersion, which can be produced by emulsion copolymerization of $\alpha, \beta$-monoolefinically unsaturated monocarboxylic and/or dicarboxylic acids with monoolefinically unsaturated monomers containing, if required, small quantities of polyolefinically unsaturated monomers in the presence of customary emulsifiers and dispersant and of polymerization initiators and has a copolymer content of between 35 and 55%. The production of such dilatant copolymer dispersions, which can be effected within a wide concentration range of the copolymer content with low scatter of the particle sizes, is described in detail, for example, in German Offenlegungsschrift No. 3,025,562, and to this extent is incorporated herein by reference. Copolymer dispersions of this substance category are distinguished by good long-term constancy of their chemical and physical properties. They can be produced with a very wide range of values for the initial viscosity and for the critical shear rate $\dot{\gamma}_s$. It is possible for the range of variation of the critical shear rate $\dot{\gamma}_s$ to be between $1 \, s^{-1}$ and $10^{-4} \, s^{-1}$, and the minimum value $\gamma_{min}$ of the shear which must be reached for the dilatant fluid to undergo its increase in viscosity, which is the characteristic of dilatant behavior, is around 0.5.

Of course, dilatant fluids other than those belonging to the above mentioned substance category can be used in the shear elements 58 and 59 if their rheological properties are similar or equivalent to those of the above mentioned copolymer dispersions without departing from the scope of the present invention.

The proportion of the engine output power which is consumed by friction in the locking devices 56, 57 and 58, 59, respectively, for the build-up of a degree of locking, even if limited, when the drive-slip control responds is considerably less than the loss of driving energy which, taken overall, has to be accepted, merely by activation of at least one of the wheel brakes 11 and/or 12, for building up a corresponding degree of locking of the rear-axle drive. As a result, compared to a vehicle which is equipped with a drive-slip control system which builds up a necessary degree of locking of the rear-axle drive solely by braking intervention, vehicles which are equipped with a drive slip control system as explained thus far with reference to FIGS. 1 and 2 can be provided with a relatively low-powered engine. This is true with the reservation, not very significant for driving practice, that, under extreme $\mu$ split conditions, i.e. large differences in the coefficient of adhesion between the roadway and the two driving vehicles wheels, a reduced climbing ability of the vehicle must be accepted, even for the alternative embodiment of FIG. 3 which is distinguished by a particularly simple construction both of the anti-lock brake system and of the drive-slip control system.

Figure 3:
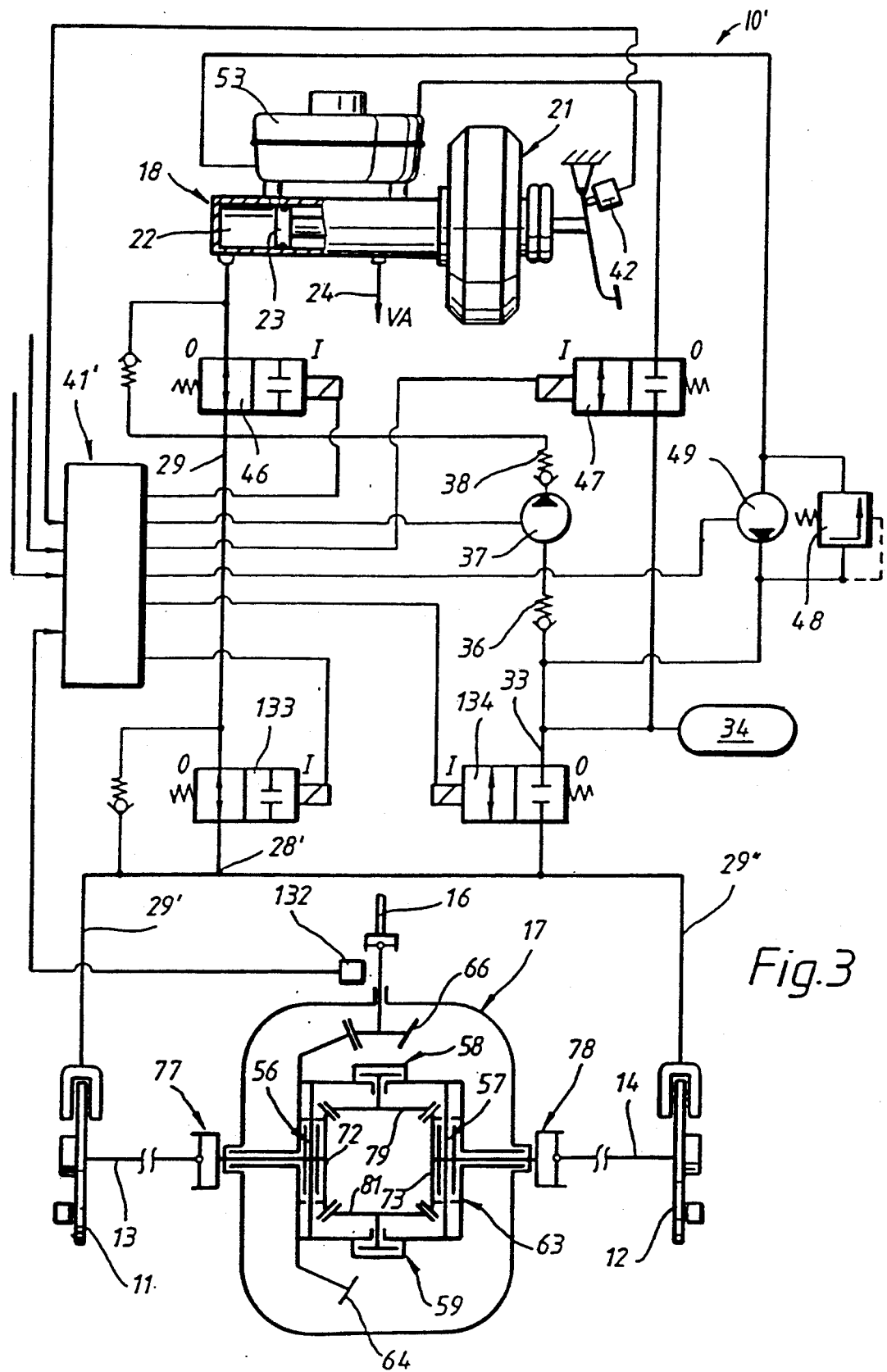
FIG. 3 is a hydraulic diagram similar to FIG. 1 of another embodiment of the present invention.

Structural and functional elements of the brake system 10' depicted in FIG. 3 are provided with the same reference numerals as in FIGS. 1 and 2, to indicate structural and functional identity or analogy of these elements and also to refer to those parts of the description which relate to FIGS. 1 and 2 to avoid repetition.

In the brake system 10' according to FIG. 3, in contradistinction to the brake system 10 according to FIG. 1, the anti-lock brake system is a three-channel system which operates with individual brake-pressure control at the front wheel brakes (not shown) and common brake-pressure control at the rear wheel brakes 11, 12 of the vehicle. Accordingly, only a single wheelspeed sensor 132 is provided for the two rear wheels. The level and/or frequency of the output signal of the sensor is a measure of the sum of the speeds $\omega_{Rl}$ and $\omega_{Rr}$ of the driven rear wheels of the vehicle. In accordance with the provided type of anti-lock brake control, only a single inlet valve 133 is provided for the rear-axle brake circuit, and that portion of the master brake line 29 of the rear-axle brake circuit which extends between the ASR control valve 46 and the branch point 28' from which the brake-line branches 29' and 29' leading to the rear wheel brakes 11 and 12 start is passed via this inlet valve. Only one outlet valve 134 is connected hydraulically between the branch point 28' of the master brake line 29 of the rear-axle brake circuit and the return line 33, to which the buffer accumulator 34 and the inlet side or inlet nonreturn valve 36 of the return feed pump 37 are connected.

The electronic control unit 41' again provided both for controlling control phases of the anti-lock control system and for controlling control phases of the drive-slip control system is modified such that, in combination with the output signal from the brake-light switch, it produces the output signals required for driving, in a manner appropriate for control. The inlet valve 133 and the outlet valve 134 and the ASR function control valve 46 and the ASR outlet valve 47 by processing the output signals of only three wheel-speed sensors.

The inlet valve 133 and the outlet valve 134 are again constructed as 2/2-way solenoid valves with a throughflow position and a blocking position. The starting position 0 of the inlet valve 133 is its throughflow position, and the starting position 0 of the outlet valve 134 is its blocking position.

Instead of the inlet/outlet valve pair 133, 134, a single 3/3-way solenoid valve can be used and driven out of a pressure build-up position, as the starting position, via a blocking position. A simplified differential 17 can also be achieved by providing only one locking device 56 or 57, which interacts with one of the driving ring gears 72, 73.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle drive-slip control system, comprising a differential for transmitting one of engine output torque and gearbox output torque to driven vehicle wheels, with the system operating on a principle of retarding a vehicle wheel having a tendency to spin and driven via the differential by activating a wheel brake associated therewith and, if a deceleration of both driven vehicle wheels is appropriate to limit drive-slip, of reducing the engine torque, and at least one locking device operatively associated with the differential so that the at least one locking device develops, as a difference in propulsive torques which can be transmitted via the driven vehicle wheels, between the driven vehicle wheels and the roadway increases, an increasing degree of locking limited to a value of around 40% relative to a maximum locking amount.

2. The drive-slip control system according to claim 1, wherein at least one of the at least one locking device is a friction clutch arranged to provide a frictional coupling of at least one of driving ring gears to a cage of the differential.

3. The drive-slip control system according to claim 1, wherein at least one of the at least one locking device is a friction clutch arranged to provide a frictional coupling of one of differential bevel gears to a cage of the differential.

4. The drive-slip control system according to claim 2, wherein the at least one locking device are friction clutches assigned individually to each of the driving ring gears of the differential.

5. The drive-slip control system according to claim 4, wherein the differential is a limited-slip differential, the driving ring gears are arranged axially movable on the cage and housing of the differential and are urged axially displaceably by gearing forces which arise between differential bevel gears and the driving ring gears when differing values of torques are transmitted via side shafts, and are thereby urged against clutch elements which, as a result, provide an increasing frictional engagement between the driving ring gears and the cage of the differential.

6. The drive-slip control system according to claim 5, wherein, the locking devices comprise clutch plates connected to a respective side shaft rotationally firm but axially displaceable relative to the side shaft, and clutch plates mounted on the cage rotationally, firm and axially displaceable, with lateral walls of the cage forming abutments for the clutch elements.

7. The drive-slip control system according to claim 4, wherein the locking devices are hydraulically actuable, electrically controllable differential locks with a limited degree of locking.

8. The drive-slip control system according to claim 7, wherein the differential a limited-slip differential, the driving ring gears are arranged axially movable on the cage and housing of the differential and are urged axially displaceably by gearing forces which arise between differential bevel gears and the driving ring gears when differing values of torques are transmitted via side shafts, and are thereby urged against clutch elements which, as a result, provide an increasing frictional engagement between the driving ring gears and the cage of the differential.

9. The drive-slip control system according to claim 8, wherein, the locking devices comprise clutch plates connected to a respective side shaft rotationally firm but axially displaceable relative to the side shaft, and clutch plates mounted on the cage rotationally, firm and axially displaceable, with lateral walls of the cage forming abutments for the clutch elements.

10. The drive-slip control system according to claim 3, wherein shear chambers are operatively arranged provided on the cage of the differential and are filled with a dilatant fluid, shear discs arranged in the shear chambers and connected rotationally firmly to the differential bevel gears such that boundary faces thereof delimit shear gaps on one side within the shear chamber, in which gaps, above a minimum amount of the rotation and of the angular velocity of the differential bevel gears, threshold values of shear and of shear rate which are characteristic for the occurrence of a viscosity jump of the dilatant fluid are exceeded.

11. The drive-slip control system according to claim 10, wherein the at least one locking device are friction clutches assigned individually to each of the driving ring gears of the differential.

12. The drive-slip control system according to claim 11, wherein the differential is limited-slip differential, the driving ring gears are arranged axially movable on the cage and housing of the differential and are urged axially displaceably by gearing forces which arise between differential bevel gears and the driving ring gears when differing values of torques are transmitted via side shafts, and are thereby urged against clutch elements which, as a result, provide an increasing frictional engagement between the driving ring gears and the cage of the differential.

13. The drive-slip control system according to claim 12, wherein, the locking devices comprise clutch plates connected to a respective side shaft rotationally firm but axially displaceable relative to the side shaft, and clutch plates mounted on the cage rotationally firm and axially displaceable, with lateral walls of the cage forming abutments for the clutch elements.

14. The drive-slip control system according to claim 13, wherein the locking devices are hydraulically actuable, electrically controllable differential locks with a limited degree of locking.

15. The drive-slip control system according to claim 1, wherein, only one common inlet valve is provided, for the wheel brakes of both driven vehicle wheels, via which inlet valve brake-pressure build-up in both wheel brakes is effected, and only one common outlet valve is provided, via which both brakes of the driven vehicle wheels can be jointly connected to a return line of an anti-lock system, and only one wheel-speed sensor is, assigned to the driven vehicle wheels the level and/or frequency of the output signal of said sensor being a measure of the sum of wheel speeds of both driven vehicle wheels.

* * * * *